June 23, 1925.  1,542,887

J. L. IRVIN ET AL

OXYACETYLENE PIPE CUTTER ATTACHMENT

Filed May 19, 1923   3 Sheets-Sheet 3

Patented June 23, 1925.

1,542,887

UNITED STATES PATENT OFFICE.

JOHN L. IRVIN AND LEO A. BRAUER, OF BEAUMONT, TEXAS.

OXYACETYLENE PIPE-CUTTER ATTACHMENT.

Application filed May 19, 1923. Serial No. 640,063.

*To all whom it may concern:*

Be it known that we, JOHN L. IRVIN and LEO A. BRAUER, citizens of the United States, residing at Beaumont, Jefferson County, Texas, have invented a certain new and useful Improvement in Oxyacetylene Pipe-Cutter Attachments, of which the following is a full, clear, and exact description, such as will enable others skilled in the art to which it appertains to make and use the same.

The invention relates to an attachment for pipe cutting machines whereby a blow pipe torch may be guided as the pipe is rotated so as to cut the said pipe along the desired path, It has been found exceedingly difficult with methods now in use to cut pipes accurately where one pipe is to be joined to another at an angle thereto. Various means of marking and cutting the two pipes thus to be joined together have been evolved, most of which include the use of expensive equipment and skilled labor. The line is irregular and must be accurately cut.

It is an object of this invention to construct an apparatus whereby the pipe to be cut may be accurately held while it is rotated and to provide means to hold and guide the blow torch along the desired path.

Another object is to provide a bushing or pattern of the desired shape, to direct the torch in a path or line so as to cut the pipe, and to automatically hold the torch in contact with the bushing during operation.

These and other objects and advantages of the invention and the means by which they are accomplished will be more fully set forth in the specification which follows.

Figure 1:
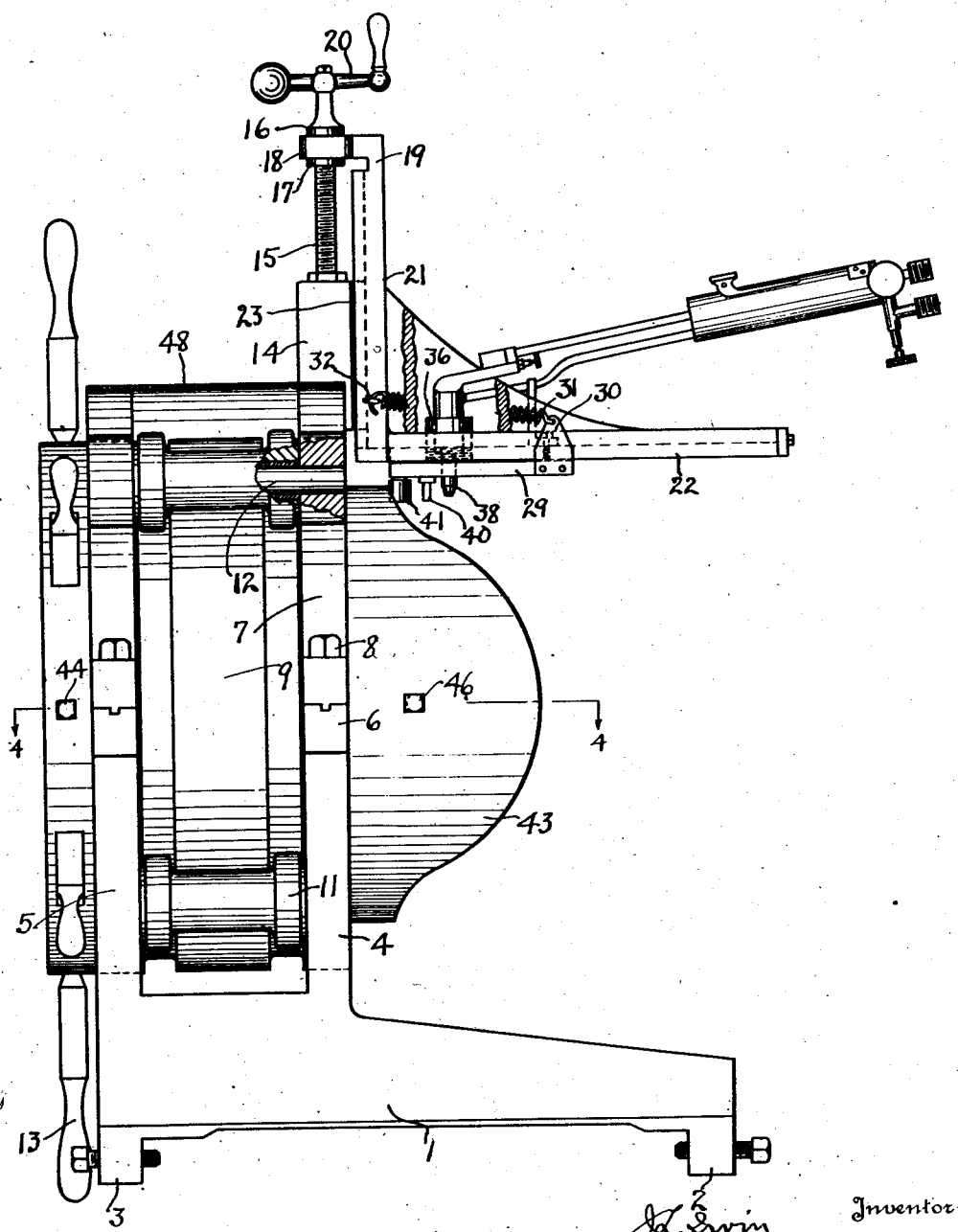
Figure 2:
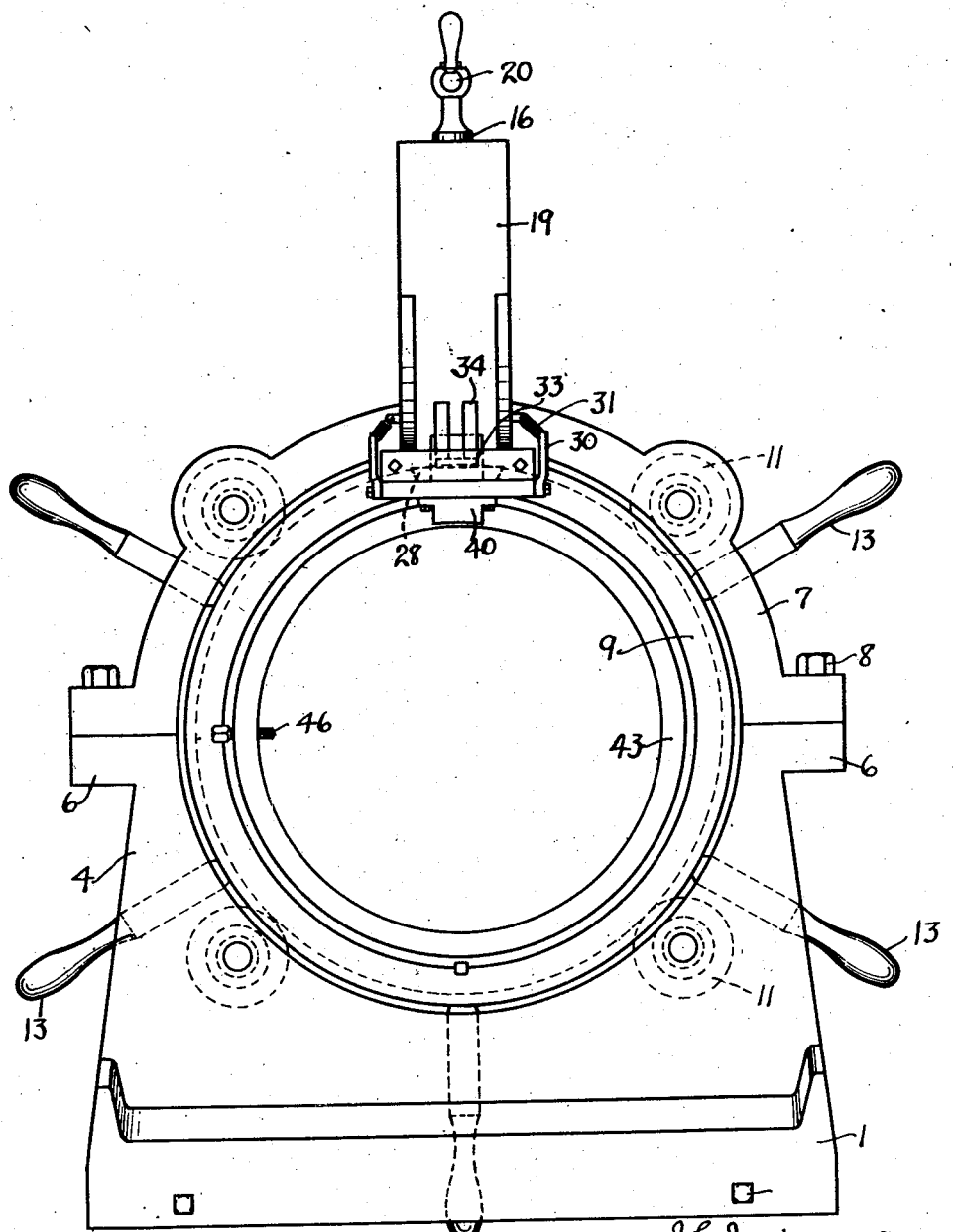
Figure 3:
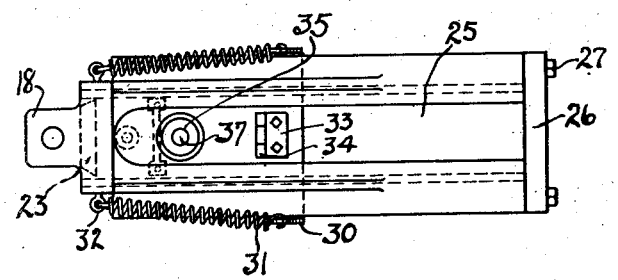
Figure 4:
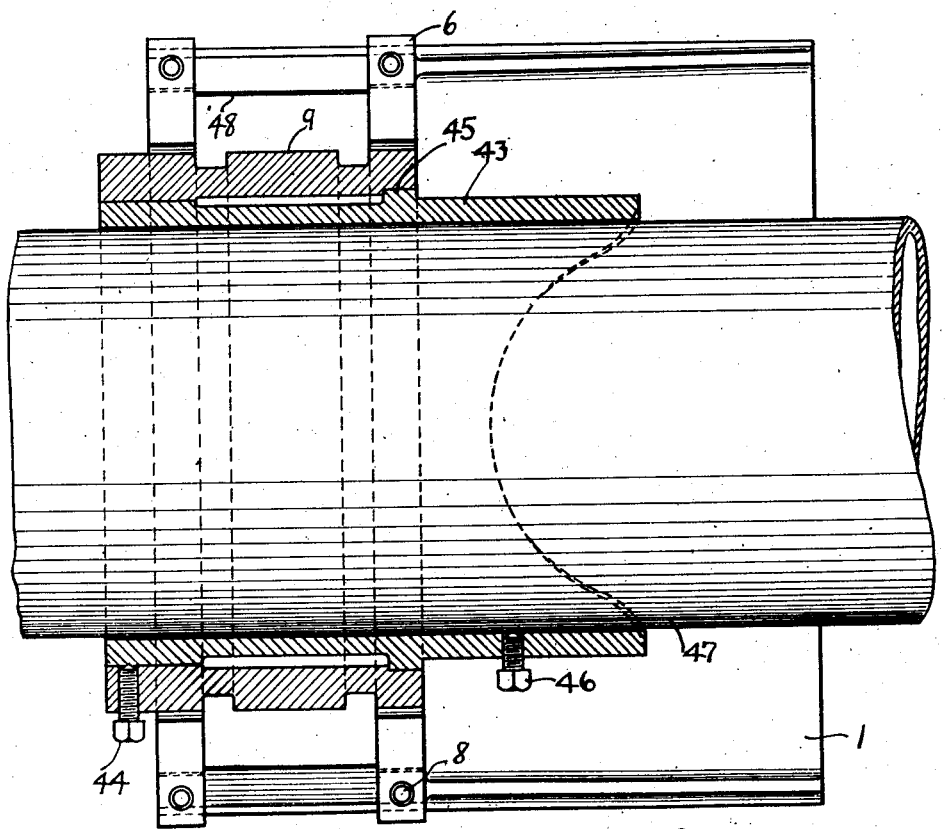

Referring to the drawings herewith, which form a part of this specification, there is disclosed a preferred form of construction embodying our invention. Fig. 1 is a side elevation of the invention, certain parts being broken away for greater clearness; Fig. 2 is front elevation thereof; Fig. 3 is a top plan view of the torch-holding bracket; and Fig. 4 is a central longitudinal section on the line 4—4 of Fig. 1.

In mounting the attachment there is a base 1 having forward and rear supporting lugs 2 and 3 respectively. These lugs may be provided with set screws by means of which the base may be secured on the pipe supporting bench or table.

Toward the rear of the base 1 are two spaced upright supports 4 and 5. As shown in Fig. 2 these supports have a semicircular inner face and the upper edge has oppositely extending lugs 6 upon which is seated a semicircular cooperating member 7 adapted to be secured thereon by bolts or set screws, 8.

These two parts, 4 and 7, together enclose a circular opening through which a master chuck 9 extends. Said chuck is cylindrical and tubular and has circumferential grooves 10, 10 adjacent the inner faces of said standards 4 and 5 to receive the enlarged ends of the supporting rollers 11 mounted to rotate on pins 12 supported at their ends in the forward and rear supports 4 and 5 and the cooperating parts 7. There are four of the said rollers 11 in this embodiment spaced at equal distances about the chuck and, because the chuck has a smaller external diameter than the supporting frame, the chuck is entirely supported on said rollers.

At the rear end of said chuck are a number of spaced radial handles or arms 13 by means of which said chuck may be rotated.

On the upper side of the forward support 7 is formed an upwardly extending arm 14, having a longitudinal threaded channel therein to receive a screw shaft 15 on the upper end of which is a head 16 and a spaced nut 17 between which is included a plate 18 upon a torch-holding bracket 19. The upper end of said shaft 15 has a handle or crank 20 thereon by which it is rotated.

The torch bracket 19 has an upright arm 21 parallel with the shaft 15 and a lower horizontal arm 22 at right angles to the arm 21. The rear face of the upright arm 21 is formed with a dovetailed mortice therein to receive a tenon 23 upon the support 14, thus making the bracket slidable vertically on the support and adjustable by means of the screw shaft 15. The forward arm 22 of the torch-holding bracket 19 forms a support upon which the torch bracket may slide. To accommodate the torch slide, the central portion of the said arm is slotted out at 25, as shown in Fig. 3, and the two ends of the said arm are held in rigid spaced relation by means of a bar 26 secured to each of the sides of said arm, by means of set screws or pins, 27. The lower face of the slot 25 is undercut to form a dovetailed mortice, 28, to receive a corresponding tenon on the upper face of the sliding torch plate 29.

The said plate 29 is of the same width as is the arm 22, and materially shorter in length. The upper face of the torch plate is tenoned, as previously described, to fit within the mortice on the arm 22, and is slidable longitudinally of said arm and held in position by means of its connection with the arm. The plate 29 has at its forward end two upstanding lugs 30 which are perforated at the upper end to provide attachment for a coil spring, 31. The springs at each side of the torch plate extend rearwardly and are attached at their other ends within eyes 32 on the upright arm 21 of the torch holder. On the upper face of said slide plate there is a torch guide 33 having thereon two upstanding arms 34 between which the connecting pipes on the blow torch may be positioned. Rearwardly of this guide the plate is countersunk for a short distance, as shown at 35, to provide a seat for the head 36 of the blow torch. Below this countersunk portion an opening 37 through the plate allows the insertion of the nozzle 38 of the said torch. Immediately to the rear of the blow torch nozzle there is a downwardly projecting baffle or guard 40, which serves to prevent the rearward deflection of the blaze from the torch and guards against injury to the working parts of the device. Immediately behind the said baffle 40 is a roller 41 mounted upon a vertical shaft projecting downwardly from the torch plate. This roller is adapted to roll upon the mandrel or pattern which serves to guide the blow torch.

The mandrel or pattern referred to is shown at 43. It has a tubular sleeve fitting closely within the chuck 9 and adapted to be held in fixed position within said chuck by means of set screws 44 adjacent the rear end of said chuck. The forward inner end of the master chuck is recessed slightly to receive a short flange 45 formed upon the bushing or pattern 43. The said bushing projects forwardly from the chuck and has its forward end cut into a guide to direct the course of the blow torch nozzle. In the drawing the type of bushing used is for the purpose of cutting the end of a pipe to fit an opening in a second pipe and to project at right angles from said second pipe. There are, therefore, two forwardly curved sides upon the bushing which will fit around the opening in the pipe to which it is to be connected. While this form of bushing or pattern is shown, it is obvious that the bushing may be cut or formed in many different ways and for many different sizes of pipe, and that separate bushings will be necessary for different cutting operations, depending upon the angle of connection between the pipes which are to be joined and the size of the pipes operated upon. There is upon one side of the forward end of the bushing a set screw, 46, which projects through the bushing and is adapted to fix the pipe 47 within the bushing while it is being operated upon.

In ordinary operation, it will be advantageous to cover the rollers 11 and the bearings thereof in such manner as to protect them from dust, and also to prevent injury to the said rollers, and avoid accidents to operators. For this purpose we may use housing 48 of sheet metal, covering the upper part of the device. This, as will be obvious, is optional with the user, and is not a necessary part of the invention.

In the use of this invention, it is contemplated that the attachment will be mounted toward the forward end of the bench upon which the pipe is supported. The pipe will be extended centrally through the bushing until the proper point upon the pipe comes at the end of the bushing. The pipe will then be fixed in position by tightening the set screws 46. The action of the springs 31 will be to draw the torch plate 29 rearwardly, bringing the roller 41 against the forward margin of the bushing 43, and the screw 15 may be rotated to adjust the bracket 19 vertically, so as to bring the roller 41 accurately against the forward end of the bushing. This will space the nozzle 38 of the blow torch at the proper point upon the pipe for operation. The blow torch may be then ignited, and as the cutting operation proceeds the chuck 9, carrying with it the bushing 43, may be rotated by means of the arms 13 on the chuck so as to throw the pipe, bushing and chuck around the longitudinal axis of the pipe. As the pipe rotates, the contact of the roller 41 with the forward curved end of the bushing will guide the torch in the proper curved path around the pipe, so as to cut it along the line desired. The rotation of the pipe will be made easy by the fact that the chuck and pipe will be supported upon the roller bearings 11. When the pipe has been completely severed the blow torch will be turned off, and the pipe removed, and the apparatus will be ready for a second cutting operation. It will be obvious that with this device and with accurately formed bushings the cutting of pipe in the desired form will be readily and easily accomplished by the use of labor which is not necessarily skilled in the art, and that, further, a great saving in labor will be accomplished. The guiding of the torch and holding it accurately spaced relative to the pipe, will be accomplished in an automatic manner not requiring the services of a skilled mechanic, as is usual in such operations.

While we have shown and described certain details of construction connected with this embodiment of our invention, we wish it understood that various changes and modifications may be made in the apparatus constituting our invention, without departing from the spirit thereof.

Having thus described our invention, what we claim as new and desire to protect by Letters Patent is:

1. A pipe cutter attachment comprising an upright supporting frame having a circular opening therethrough, nonfriction supporting rollers mounted therein adjacent said opening, a tubular master chuck rotatable in said opening, means to rotate said chuck therein, a torch-guiding bushing in said chuck, a torch-holding plate over the forward end of said bushing and means to hold said plate in uniformly spaced relation to the forward end of said bushing.

2. A pipe cutter attachment comprising a base, a plurality of upright supporting frames thereon having circular openings therein, a tubular master-chuck rotatable in said openings, means to rotate said chuck, a sleeve bushing in said chuck and rotatable therewith, the forward end of said bushing being formed into a predetermined pattern, a torch-holding plate and means to hold said plate resiliently against the forward end of said bushing.

3. A pipe cutter attachment comprising spaced supports having openings therein, a master chuck in said openings, roller supports for said chuck, means to rotate said chuck on said rollers, a guide bushing in said chuck, a torch holder supported at the forward end of said bushing and means to retain said holder against said bushing in the manner described.

4. A pipe cutter attachment comprising spaced upright supports having aligned openings therein, a master chuck rotatable in said openings, means to rotate said chuck, a removable bushing in said chuck having its forward end cut as a guide, a support above said chuck, a torch bracket adjustable thereon, a torch plate slidable on said bracket and means to hold said torch plate in spaced relation to said guide.

5. A pipe cutter attachment comprising a master chuck, a support on which said chuck is rotatable, means to rotate said chuck, a bushing in said chuck adapted to rotate therewith, an adjustable torch supporting bracket above the forward end of said bushing, a torch plate on said bracket, a roller on said plate and a spring adapted to hold said roller against the forward end of said bushing while said bushing and chuck are rotated.

6. A pipe cutter attachment comprising a master chuck, a support on which said chuck is rotatable, means to rotate said chuck, a tubular torch guiding bushing in said chuck, a torch support adjacent the end of said bushing and automatic means acting to retain said torch support in spaced relation to said guiding bushing when said bushing is rotated.

7. A pipe cutter attachment comprising a rotatable tubular master chuck, a support for said chuck, means to rotate said chuck around its longitudinal axis on said support, a torch guide bushing in said chuck, a torch support, a torch holder slidable on said support, and means to hold said holder resiliently against the forward end of said bushing while said bushing is being rotated.

8. A pipe cutter attachment comprising a horizontal rotatable tubular chuck, a bushing therein, a torch supporting bracket, means to adjust said bracket vertically, a torch holder slidable horizontally on said bracket, and springs acting to retain said holder against the forward end of said bushing.

9. A pipe cutter attachment comprising a rotatable chuck, a torch guide bushing in said chuck rotatable on an approximately horizontal axis, a tubular torch holder and means to retain said holder in suitable spaced relation relative to the forward end of said bushing.

In testimony whereof, we hereunto affix our signatures, this 12th day of May, A. D. 1923.

JOHN L. IRVIN.
LEO A. BRAUER.